(12) United States Patent
Liu et al.

(10) Patent No.: US 6,265,504 B1
(45) Date of Patent: Jul. 24, 2001

(54) PREPARATION OF ULTRA-HIGH-MOLECULAR-WEIGHT POLYETHYLENE

(75) Inventors: Jia-Chu Liu, Mason; Mark P. Mack, West Chester, both of OH (US); Clifford C. Lee, Houston, TX (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/401,472

(22) Filed: Sep. 22, 1999

(51) Int. Cl.$^7$ .................................................. C08F 4/42
(52) U.S. Cl. ................... 526/161; 526/127; 526/132; 526/160; 526/172; 526/352; 526/943; 502/117; 502/152; 502/200; 502/202
(58) Field of Search .................... 526/127, 132, 526/172, 160, 352, 161, 943; 502/117, 152, 200, 202

(56) References Cited

U.S. PATENT DOCUMENTS

| | | | |
|---|---|---|---|
| 5,064,802 | 11/1991 | Stevens et al. | 502/155 |
| 5,444,145 | 8/1995 | Brant et al. | 526/348.3 |
| 5,599,761 | 2/1997 | Turner | 502/152 |
| 5,637,660 | 6/1997 | Nagy et al. | 526/160 |
| 5,756,611 | 5/1998 | Etherton et al. | 526/127 |
| 5,756,660 | 5/1998 | Shiraishi et al. | 528/502 |

FOREIGN PATENT DOCUMENTS

WO 96/23004 * 8/1996 (WO).

OTHER PUBLICATIONS

Ihara et al. Macromol. Chem. Phys. 197, 1909–1917, 1996.*
Saechtling, International Plastics Handbook, 2nd Edition, Hanser, 1987.*
Merriam–Webster's Collegiate Dictionary 10th Edition, Merriam–Webster, 1996.*

* cited by examiner

Primary Examiner—David W. Wu
Assistant Examiner—Ling-Siu Choi
(74) Attorney, Agent, or Firm—Shao Guo

(57) ABSTRACT

An ultra-high-molecular-weight polyethylene (UHMWPE) is disclosed. The UHMWPE has a weight average molecular weight (Mw) greater than about 3,000,000 and molecular weight distribution less than about 5. A process for making the UHMWPE is also disclosed. The process is performed with a heteroatomic ligand-containing single-site catalyst in the presence of a non-alumoxane activator, but in the absence of an α-olefin, an aromatic solvent, and hydrogen.

8 Claims, No Drawings

PREPARATION OF ULTRA-HIGH-MOLECULAR-WEIGHT POLYETHYLENE

FIELD OF THE INVENTION

The invention relates to an ultra-high-molecular-weight polyethylene (UHMWPE) compositions that have exceptionally narrow molecular weight distributions. The invention also relates to a process for preparing the UHMWPE compositions with a single-site catalyst having a heteroatomic ligand.

BACKGROUND OF THE INVENTION

Ultra-high-molecular-weight polyethylene (UHMWPE) has a molecular weight that is 10 to 20 times greater than high-density polyethylene (HDPE). It has been defined by ASTM as having a weight average molecular weight (Mw) greater than 3,000,000.

In addition to the chemical resistance, lubricity, and excellent electrical properties of conventional HDPE, UHMWPE offers major advantages in toughness, abrasion resistance, and freedom from stress-cracking.

UHMWPE is produced by Ziegler polymerization. U.S. Pat. No. 5,756,600 teaches how to make an ultra-high-molecular-weight polyethylene with Ziegler catalyst. The process requires exceptionally pure ethylene and other raw materials. An α-olefin comonomer, such as 1-butene, may be incorporated into UHMWPE according to U.S. Pat. No. 5,756,600. Like conventional HDPE, UHMWPE made by Ziegler polymerization has a broad molecular weight distribution, and usually its polydispersity Mw/Mn (Mw: weight average molecular weight, Mn: number average molecular weight) is within the range of 5 to 20.

Newly developed metallocene and single-site catalysts advantageously provide polyethylene and other polyolefins with very narrow molecular weight distribution (Mw/Mn from 1 to 5). The narrow molecular weight distribution results in reduced low molecular weight species. These new catalysts also significantly enhance incorporation of long-chain α-olefin comonomers into polyethylene, and therefore reduce its density. Unfortunately, however, these catalysts produce polyethylene having a lower molecular weight than that made with Ziegler catalyst. It is extremely difficult to produce UHMWPE with metallocene and single-site catalysts. For example, U.S. Pat. No. 5,444,145 teaches preparation of polyethylene having a Mw up to 1,000,000 with a cyclopentadienyl metallocene catalyst. However, its molecular weight is significantly lower than the required for UHMWPE.

UHMWPE that has a narrow molecular weight distribution is unknown and is needed. A feasible process for preparing it would be valuable.

SUMMARY OF THE INVENTION

The invention is an ultra-high-molecular-weight polyethylene (UHMWPE) composition that has a narrow molecular weight distribution. The UHMWPE has a weight average molecular weight (Mw) greater than about 3,000,000 and a molecular weight distribution (Mw/Mn) less than about 5.

The invention includes a process for preparing UHMWPE. The process comprises polymerizing ethylene with a single-site and a non-alumoxane activator at temperature within the range of about 40° C. to about 110° C. The single-site catalyst comprises a Group 3-10 transition or lanthanide metal and a heteroatomic ligand. The process is performed in the absence of hydrogen, α-olefin comonomers, and aromatic solvents.

The invention also includes film, sheet, pipe and other articles made from the UHMWPE of the invention.

We surprisingly found that when a heteroatomic ligand containing catalyst is used, ultra-high-molecular-weight polyethylene can be obtained only in the presence of a non-alumoxane activator, only in the absence of an α-olefin comonomer, aromatic solvent, and hydrogen, and only at a relatively low polymerization temperature.

DETAILED DESCRIPTION OF THE INVENTION

The invention is an ultra-high-molecular-weight polyethylene (UHMWPE) that has a narrow molecular weight distribution. It has a weight average molecular weight (Mw) greater than about 3,000,000, and a molecular weight distribution (Mw/Mn) less than about 5. Preferably, its Mw is greater than about 4,500,000, and its Mw/Mn less than about 3.

The UHMWPE of the invention incorporates essentially no α-olefin comonomer. It preferably has a density within the range of about 0.94 $g/cm^3$ to about 0.98 $g/cm^3$.

The UHMWPE of the invention has significant advantages over that prepared by Ziegler polymerization. Because it contains reduced level of low molecular weight species, the UHMWPE of the invention has improved moisture-barrier properties, chemical resistance, and mechanical strength.

The UHMWPE of the invention also possesses significant advantages over known polyethylenes prepared with metallocene and single-site catalysts. Although known polyethylenes have narrow molecular weight distributions, they do not have ultra-high molecular weights, and they lack optimal properties for many applications. UHMWPE of the invention uniquely provides excellent environmental stress-crack resistance, chemical resistance, impact resistance, abrasion resistance, high tensile strength, and high moisture-barrier properties.

The UHMWPE of the invention has a variety of uses. In particular, it can be advantageously used to make film, pressure pipe, large-part blow molding, extruded sheet, and many other articles. It can be used alone or blended with other resins. Techniques for making these articles are well known in the polyolefin industry.

The invention includes a process for preparing the UHMWPE. The polymerization of ethylene is conducted with a "single-site" catalyst. By "single-site," we mean catalysts that are distinct reactive species rather than mixtures of different species. The single-site catalyst is an organometallic compound having a heteroatomic ligand. Suitable metals are Group 3-10 transition or lanthanide metals. Preferably, the metal is titanium, zirconium, or hafnium.

The single-site catalyst contains at least one heteroatomic ligand. Preferably, the heteroatomic ligand is a substituted or unsubstituted boraaryl, azaborolinyl, pyridinyl, pyrrolyl, indolyl, carbazolyl, or quinolinyl group.

In addition to a heteroatomic ligand, other ligands are used. The total number of ligands satisfies the valence of the transition metal. Other suitable ligands include substituted or unsubstituted cyclopentadienyls, indenyls, fluorenyls, halides, $C_1$–$C_{10}$ alkyls, $C_6$–$C_{15}$ aryls, $C_6$–$C_{20}$ arylkyls, dialkylamino, siloxy, alkoxy, and the like, and mixtures thereof.

The catalyst is used with a non-alumoxane activator. Alumoxane compounds, such as methyl alumoxane or ethyl alumoxane, are not suitable activators for the process of the invention. When an alumoxane activator is used with the single-site catalyst, the UHMWPE cannot be made.

Suitable non-alumoxane activators include alkyl aluminums, alkyl aluminum halides, anionic compounds of boron or aluminum, trialkylboron and triarylboron compounds, and the like. Examples are triethylaluminum, trimethylaluminum, diethylaluminum chloride, lithium tetrakis(pentafluorophenyl) borate, triphenylcarbenium tetrakis(pentafluorophenyl) borate, lithium tetrakis (pentafluorophenyl) aluminate, tris (pentafluorophenyl) boron, tris(pentabromophenyl) boron, and the like. Other suitable activators are known, for example, in U.S. Pat. Nos. 5,756,611, 5,064,802, and 5,599,761, and their teachings are incorporated herein by reference.

Activators are generally used in an amount within the range of about 0.01 to about 100,000, preferably from about 0.1 to about 1,000, and most preferably from about 0.5 to about 50, moles per mole of the single-site catalyst.

The polymerization is conducted at a temperature within the range about 40° C. to 110° C. preferably about 50° C. to 80° C. A high polymerization temperature results in a low molecular weight of polyethylene. If the temperature is too high, UHMWPE cannot be obtained.

The polymerization is preferably conducted under pressure. The reactor pressure is preferably in the range of about 150 to about 5,000 psi, more preferably from about 300 to about 3,000 psi, and most preferably from about 500 to about 2,000 psi. Generally, the higher the pressure, the more productive the process.

The process of the invention includes solution, slurry, and gas phase polymerizations. Solution polymerization is preferred because it is easily controlled. The process is conducted in the absence of aromatic solvent. We surprisingly found that using an aromatic solvent in the process reduces the molecular weight of polyethylene and that UHMWPE cannot be obtained when an aromatic solvent is used. Saturated aliphatic and cyclic hydrocarbons are suitable solvents. Preferred solvents include pentane, hexane, heptane, octane, isobutane, cyclohexane, and the like, and mixtures thereof.

The process of the invention is performed in the absence of hydrogen or any other chain transfer agent. Using hydrogen in the process reduces the molecular weight of the polyethylene. UHMWPE cannot be obtained in the presence of hydrogen.

The process of the invention is conducted in the absence of other α-olefin comonomers such as propylene, 1-butene, or 1-hexene.

Incorporation of an α-olefin comonomer reduces the molecular weight of polyethylene. UHMWPE cannot be obtained when an α-olefin comonomer is used.

Polyethylene made by the process of the invention has a Mw that is greater than about 3,000,000 and Mw/Mn less than about 5. More preferably, it has a Mw greater than about 4,500,000 and a Mw/Mn less than about 3.

The following examples merely illustrate the invention. Those skilled in the art will recognize many variations that are within the spirit of the invention and scope of the claims.

EXAMPLE 1

Polymerization is conducted in a 2 L stainless steel pressure reactor. The reactor is heated at 130° C. for an hour, purged with nitrogen three times, and then sealed and cooled to 25° C. 8-Quinolinyl titanium trichloride (0.0027 g, 0.009 mmol.), triethylaluminum (TEAL) (0.9 mmol, 0.56 mL, 25% by weight in isobutane), and isobutane (1000 mL) are charged into the reactor. After the reactor contents are heated to 60° C., ethylene, dried by passing through 13×molecular sieves, is fed into the reactor via a pressure regulator to start the polymerization. The polymerization is performed at 60° C. by continuously feeding ethylene to maintain the reactor pressure at 500psi. The polymerization is terminated by venting the reactor. Butylated hydroxytoluene (BHT, 1000 ppm) is added to the polymer. The polymer is dried for an hour at 80° C. under vacuum. It has Mw=5,100,000, and Mw/Mn=2.62.

EXAMPLE 2

The procedure of Example 1 is repeated, but the polymerization is performed at 75° C. instead of 60° C. The polymer has Mw=5,500,000, and Mw/Mn=2.68.

EXAMPLE 3

The procedure of Example 1 is repeated, but the polymerization is performed at 80° C. instead of 60° C. The polymer has Mw=3,670,000, and Mw/Mn=4.2.

EXAMPLE 4

The procedure of Example 1 is repeated, but 2-pyridinyl titanium trichloride is used as catalyst instead of 8-quinolinyl titanium trichloride. The polymer has Mw=4,200,000, and Mw/Mn=2.53.

EXAMPLE 5

The procedure of Example 4 is repeated, but the polymerization is performed at 75° C. instead of 60° C. The polymer has Mw=4,600,000, and Mw/Mn=2.64.

EXAMPLE 6

The procedure of Example 1 is repeated, but 2-quinolinyl titanium trichloride is used as catalyst instead of 8-quinolinyl titanium trichloride. The polymer has Mw=5,300,000, and Mw/Mn=2.62.

EXAMPLE 7

The procedure of Example 6 is repeated, but the polymerization is performed at 75° C. instead of 60° C. The polymer has Mw=5,200,000, and Mw/Mn=2.66.

EXAMPLE 8

The procedure of Example 1 is repeated, but 3-pyridinyl titanium trichloride is used as a catalyst instead of 2-pyridinyl titanium trichloride. The polymer has Mw=5,100,000 and Mw/Mn=2.48.

EXAMPLE 9

The procedure of Example 8 is repeated, but the polymerization is performed at 75° C. instead of 60° C. The polymer has Mw=5,400,000, and Mw/Mn=2.58.

COMPARATIVE EXAMPLE 10

The procedure of Example 1 is repeated, but methyl alumoxane (MAO) is used as the activator instead of TEAL. The polymer has Mw =840,000, and Mw/Mn=4.25.

COMPARATIVE EXAMPLE 11

The procedure of Example 1 is repeated, but toluene is used as the solvent instead of isobutane. The polymer has Mw=1,500,000, and Mw/Mn=4.78.

We claim:

1. A process which comprises polymerizing ethylene at a temperature within the range of about 40° C. to about 110° C. in the presence of non-alumoxane activator and a single-site catalyst that comprises:
   (a) a Group 3-10 transition or lanthanide metal; and
   (b) a heteroatomic ligand selected from pyridinyl or quinolinyl; wherein the polymerization is performed in the absence of an aromatic solvent, an α-olefin comonomer, and hydrogen, and wherein the resulting polyethylene has a Mw greater than about 3,000,000 and a Mw/Mn less than about 5.0.

2. A gas phase polymerization process of claim 1.

3. A solution polymerization process of claim 1 in isobutane.

4. A slurry polymerization process of claim 1.

5. The process of claim 1 wherein the transition metal is a Group 4 metal.

6. The process of claim 1 wherein the transition metal is zirconium.

7. The process of claim 1 wherein the non-alumoxane activator is selected from the group consisting of trialkyl amines, alkyl aluminums, alkyl aluminum halides, anionic compounds boron or aluminum, trialkyl boron compounds, triaryl boron compounds, and mixtures thereof.

8. The process of claim 1 wherein the activator is triethyl aluminum.

* * * * *